United States Patent

Zoll et al.

[11] Patent Number: 5,812,585
[45] Date of Patent: Sep. 22, 1998

[54] METHOD AND ARRANGEMENT FOR ADJUSTING A MIRROR TO A LASER RESONATOR

[75] Inventors: Martin Zoll, Gechingen; Martin Wunderling, Herrenberg, both of Germany

[73] Assignee: Hewlett-Packard Company, Palo Alto, Calif.

[21] Appl. No.: 668,559

[22] Filed: Jun. 21, 1996

[30] Foreign Application Priority Data

Jul. 21, 1995 [EP] European Pat. Off. ............... 95111483

[51] Int. Cl.⁶ .................................................. H01S 3/08
[52] U.S. Cl. ........................ 372/107; 372/108; 372/99; 372/109
[58] Field of Search ................. 372/108, 109, 372/107, 99

[56] References Cited

FOREIGN PATENT DOCUMENTS

087179A1  8/1983  European Pat. Off. .
2 384 481  10/1978  France .

OTHER PUBLICATIONS

Patent Abstracts Of Japan, vol. 016, No. 230, 27 May 1992, Tokumasu Hiroshi et al., "Alignment Device For Laser Oscillator".

Patent Abstracts Of Japan, vol. 014, No. 365, 8 Aug. 1990, Ikuta Sakae, "Laser Oscillation Device".

*Primary Examiner*—Leon Scott, Jr.

[57] ABSTRACT

Method and arrangement for adjusting a mirror to a laser resonator such that the light impinging on said mirror is reflected on itself. A laser beam of an auxiliary gas laser circulates between the mirror to be adjusted and the output coupler mirror of the gas laser. A part of the laser beams reflected by the mirror is decoupled and projected as different light dots on a ground glass screen. By micro positioning of the mirror the different light dots are fused together to one light dot so that the light impinging on the mirror is reflected back on itself. The method and the arrangement allow a fast and exact adjustment of the mirror which further can be easily automated.

5 Claims, 3 Drawing Sheets

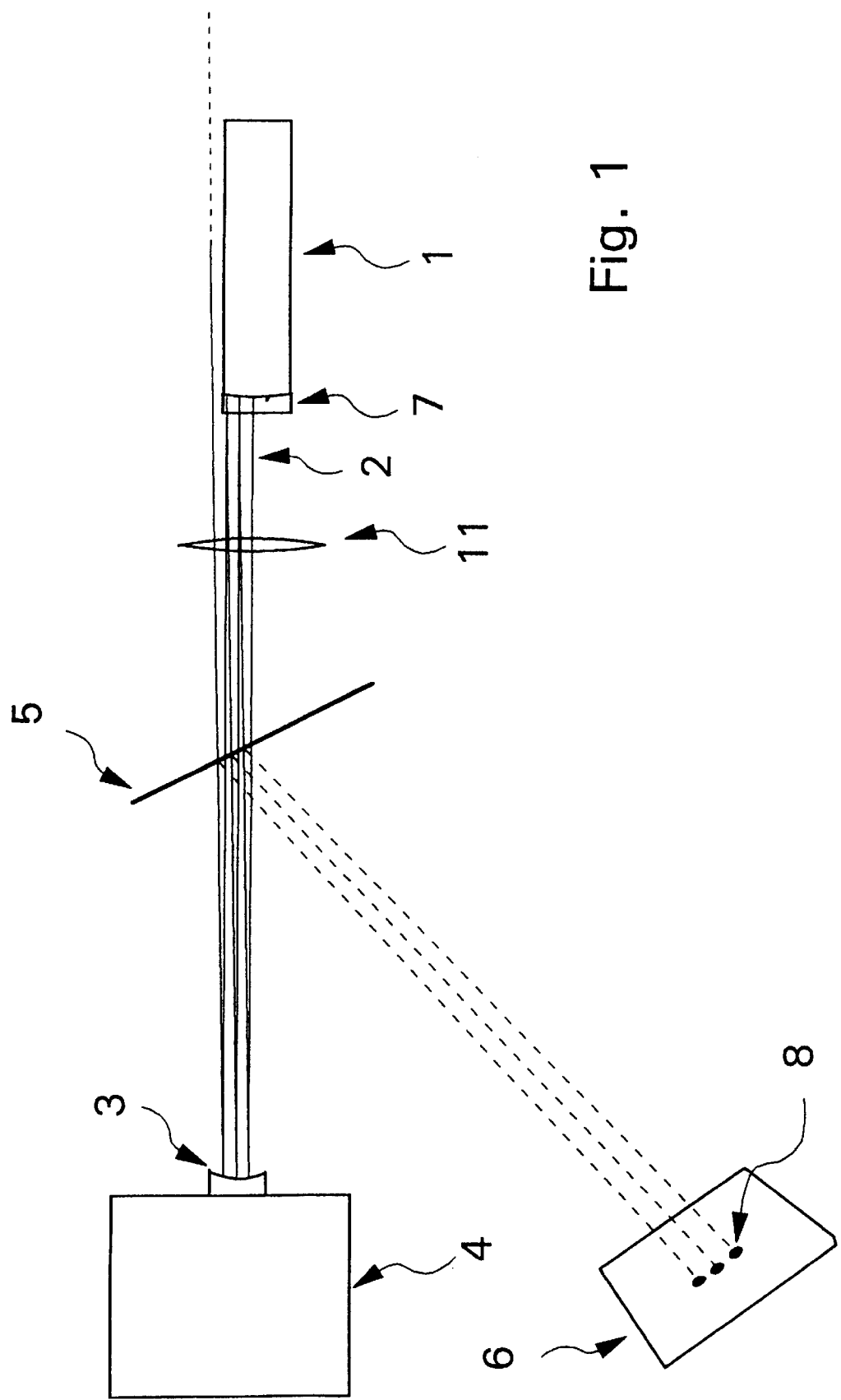

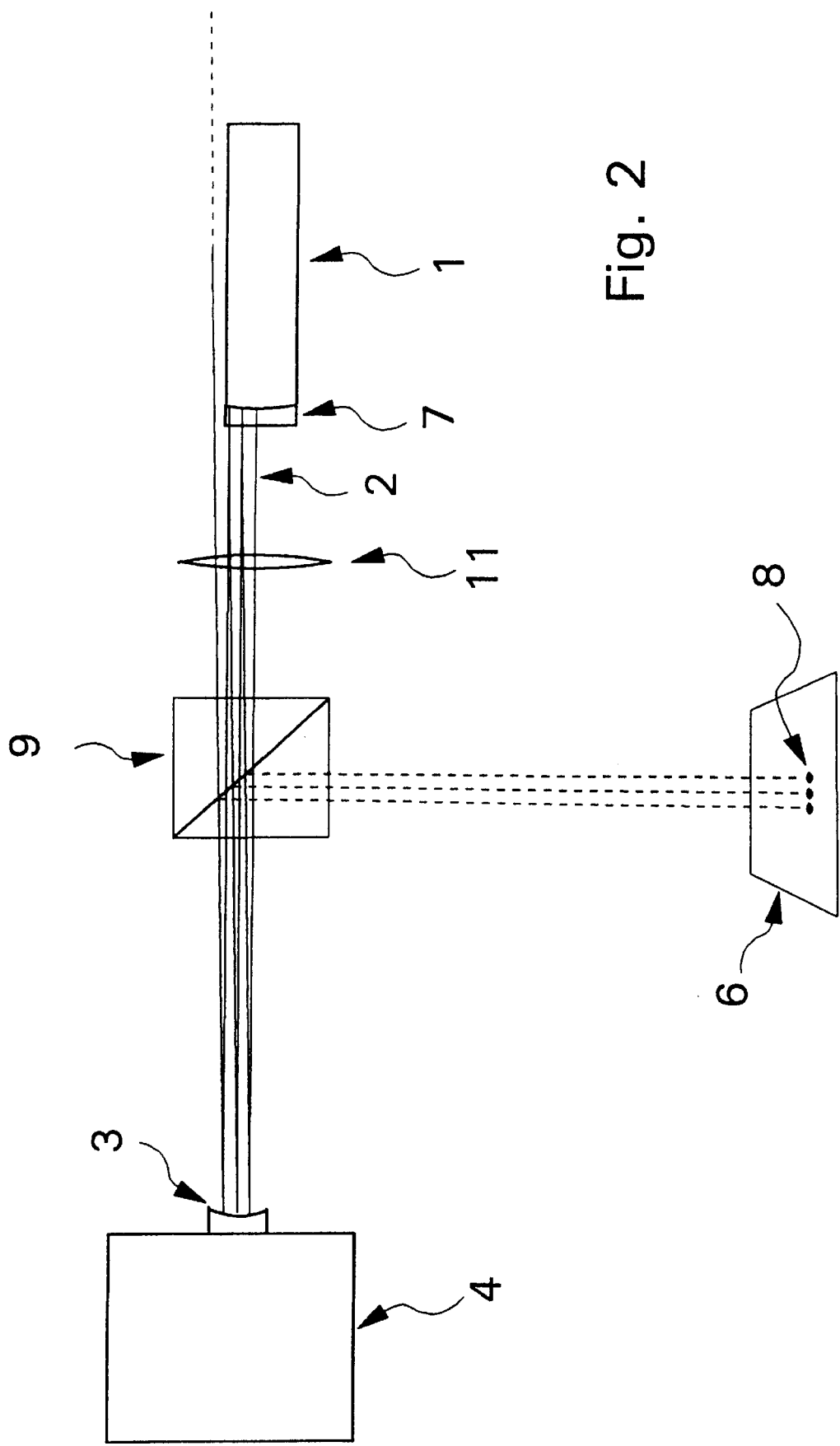

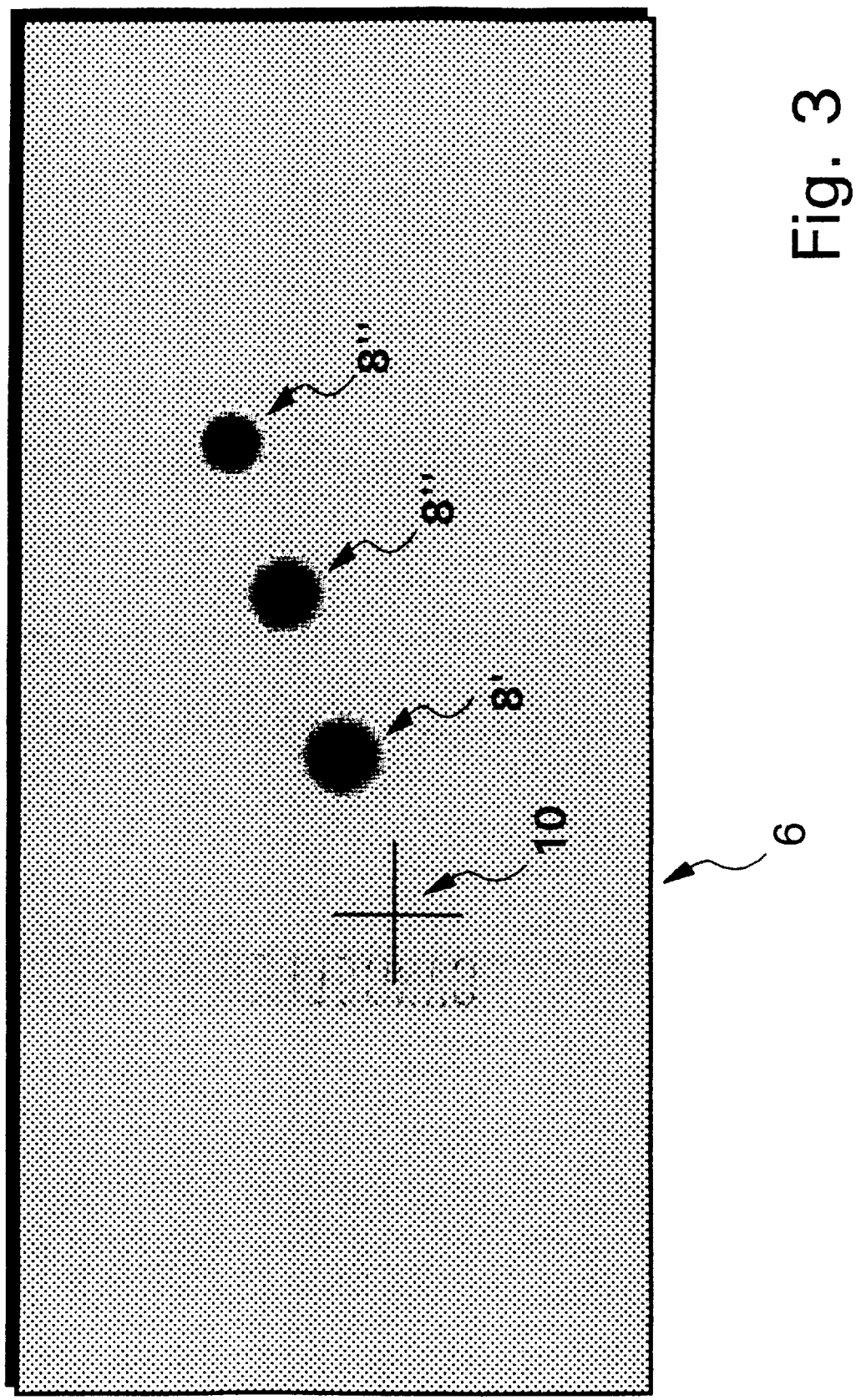

METHOD AND ARRANGEMENT FOR ADJUSTING A MIRROR TO A LASER RESONATOR

FIELD OF THE INVENTION

The present invention relates to a method and an arrangement for adjusting a mirror to a laser resonator such that the light impinging on said mirror is reflected back on itself.

BACKGROUND OF THE INVENTION

For pre-adjustment of a laser resonator, it is necessary to adjust the mirrors. The mirrors must be aligned to a laser beam impinging on the surface of the mirror such that the light is reflected back on itself or, in other words, along its longitudinal axis. This important adjustment step must be performed with great accuracy. On the other hand, for the manufacture of a laser resonator, this step should be performed as fast as possible.

SUMMARY OF THE INVENTION

Thus the invention is intended to provide a method and an arrangement which allows a safe and fast adjustment of the mirror.

According to the present invention the method for adjusting the mirror to the laser resonator comprises the following steps:

circulating a laser beam of an auxiliary gas laser between said mirror to be adjusted and the output coupler mirror of said auxiliary gas laser, decoupling a part of the reflected laser beams of one direction and projecting said decoupled parts as different light dots on projecting means, and micropositioning said mirror to be adjusted until said different light dots which are influenced by said mirror are fused together to one light dot.

Since the mirror is not adjusted, the laser beams impinging on the surface of this mirror are not reflected back along their longitudinal axis. Thus, the laser beam reflected by this mirror reaches the auxiliary mirror at a certain angle. The reflection from the surface of the auxiliary mirror leads to a laser beam which impinges on the mirror to be adjusted at another place than the first laser beam. By this, the laser beam circulates between the mirrors and reaches the mirrors at differing points of incidence. For adjustment of the mirror in order to obtain only one laser beam which is reflected back on itself and therefore reaches the surfaces of the mirrors at the same place, a small part of the reflected laser beams of one direction is decoupled, while the main part passes through the decoupling means. The decoupled part is projected on appropriate projecting means. The above mentioned circulation of the laser beams results in that the decoupled part of each laser beam of one direction being presented as a separate light dot. The number of dots depends on the misadjustment of the mirror. In view of the decoupling, the intensity of the different light dots decreases from one to the next dot.

It is possible to decouple a part either of the laser beams directed to the mirror to be adjusted or from the laser beams being reflected from this mirror. In the first case, the projected dots comprise one additional dot which is effected by the first beam directed to the mirror to be adjusted. This dot cannot be used for adjustment because it is not reflected by this mirror and thus contains no information about the misadjustment of the mirror. Ideally, only one dot is shown on the projecting means. For adjusting the mirror, the mirror is micropositionally displaced until the different light dots are fused together to one light dot.

With this method it is possible to exactly adjust the mirror because of the number of dots of the circulating laser beam between the mirrors. Another advantage is that this method can be easily automated by appropriate micro positioning means and an image processing system.

According to a preferred embodiment, a part of each laser beam reflected by the mirror to be adjusted is decoupled for projection. In a further preferred embodiment the laser beam is circulated between the mirror to be adjusted and the output coupler mirror of the auxiliary gas laser. This allows an exact reflection of the laser beams coming from the mirror to be adjusted.

The arrangement according to the invention comprises an auxiliary gas laser source which generates a laser beam directed to said mirror such that the light reflected by said mirror reaches the output coupler mirror of said auxiliary gas laser, optical decoupling means being positioned in said laser beam between said laser and said mirror for decoupling a part of the light circulating between the mirrors, projecting means for projecting said decoupled light, and micro positioning means for displacing said mirror until said laser beam is reflected back along its longitudinal axis. As the optical decoupling means, a glass plate in an inclined arrangement to the laser beam or a beam splitter cube as well-known decoupling means, can be used. When using a glass plate without an antireflecting coating on one surface, both edges of the glass plate will decouple a small part of the respective laser beam. Therefore, it is advantageous to use a glass plate with an antireflection coating to provide only one set of dots projected on the projecting means. Additionally an appropriate lens should be inserted in the optical path in order to obtain sharply defined projected dots on the projecting means. For adjusting the mirror, the micro positioning means comprises a well-known XYZ-table or another appropriate arrangement well-known to persons skilled in the art. This arrangement can easily be combined with an image processing system.

BRIEF DESCRIPTION OF THE DRAWINGS

These and other advantages and objects of the present invention can be taken from the following description of the preferred embodiments in accordance with the accompanying drawings, in which FIG. 1 is a principal schematic depiction of the arrangement with a glass plate;

FIG. 2 is a depiction of the arrangement of FIG. 1 with a beam splitter cube instead of the glass plate; and FIG. 3 is a view of projected light dots on the screen.

DETAILED DESCRIPTION OF A PREFERRED EMBODIMENT

FIG. 1 shows schematically the arrangement of an auxiliary gas laser 1, for example NeHe-laser, which generates a laser beam 2 directed to the mirror 3 to be adjusted. The mirror 3 is fixed to an XYZ-table 4 which micro positions the mirror. In this simplified depiction, the resonator to which the mirror is adjusted is not shown. Between gas laser 1 and the mirror 3, a glass plate 5 in an inclined arrangement is inserted in the optical path. The glass plate 5 has an antireflection coating which causes a small part of the beam to be reflected by the mirror 3 to be decoupled and projected onto a ground glass screen 6. The main part of the laser beam passes through the glass plate 5 and lens 11 and impinges on the output coupler mirror 7 of the gas laser 1.

In this figure, the laser beam 2 leaving the glass laser 1 reaches the mirror 3 and is reflected because of the angular misadjustment of the mirror 3. This reflected laser beam 2 passes the main part of glass plate 5 and reaches the output coupler mirror 7 which reflects the laser beam again back to the mirror 3. By this way the laser beam circulates in this figure three times between the mirrors. Each pass through the glass plate 5 of the laser beam coming from the mirror 3 effects a decoupled part 2 which is projected as a light dot 8 on the ground glass screen 6. The number of the circulations and therefore the number of the dots 8, depends on the misadjustment of the mirror 3 which decides how often the laser beam reflected from the mirror 3 reaches the output coupler 7. The mirror 3 is exactly adjusted as soon as the light dots 8 are fused to only one light dot at the target on the ground glass screen 6.

FIG. 2 shows a similar arrangement with a beam splitter cube 9 instead of the glass plate 5 of FIG. 1.

FIG. 3 shows the ground glass screen 6 with three light dots 8', 8", 8''' resulting from the first, second and third pass, respectively, of the laser beam reflected by the mirror 3 through the glass plate 5 or beam splitter cube 9. The intensity of the three dots decreases from one to the next in view of the losses and the reduced laser beam after passing the decoupling means. As soon as the mirror is adjusted such that the laser beam 2 generated by the gas laser 1 is reflected in itself, the three dots are lying upon each other at the target place 10.

We claim:

1. Method for adjusting a mirror that comprises portion of a laser resonator such that light impinging on said mirror is reflected back on itself, said method comprising the steps of:

circulating a laser beam of an auxiliary gas laser between said mirror and an output coupler mirror of said auxiliary gas laser, a misadjustment of position of said mirror causing multiple laser beams to be created within said laser resonator, reflecting a part of said laser beams that are reflected in one direction and projecting said part as different light dots onto a projecting means, and adjusting a position of said mirror to correct said misadjustment of position so that said different light dots become fused together to one light dot on said projecting means.

2. Arrangement for adjusting a mirror that comprises a portion of a laser resonator such that the light impinging on said mirror is reflected back on itself, comprising an auxiliary gas laser source for producing a laser beam that is directed to said mirror, said mirror positioned such that light reflected by said mirror reaches an output coupler mirror associated with said auxiliary gas laser source, a misadjustment of position of said mirror causing multiple laser beams to be created within said laser resonator, optical decoupling means positioned to intercept said laser beams between said gas laser source and said mirror, for reflecting a part of said multiple laser beams circulating between the mirror and said output coupler mirror, projecting means for intercepting said said laser beams that are reflected, and micropositioning means for displacing said mirror to correct said misadjustment of position so as to reduce said multiple laser beams to a single laser beam that is reflected back along a longitudinal axis of said laser resonator and produces a single dot on said projecting means.

3. Arrangement according to claim 2, wherein said decoupling means is a glass plate having an antireflection coating on one surface.

4. Arrangement according to claim 2, wherein said decoupling means is a beam splitter cube.

5. Arrangement according to 2, wherein said projecting means is a ground glass screen.

* * * * *